June 16, 1953 J. I. DODSON 2,642,468
THERMOCOUPLE MOUNTING FOR USE IN MOLTEN STEEL
Filed Sept. 15, 1950 2 Sheets-Sheet 1
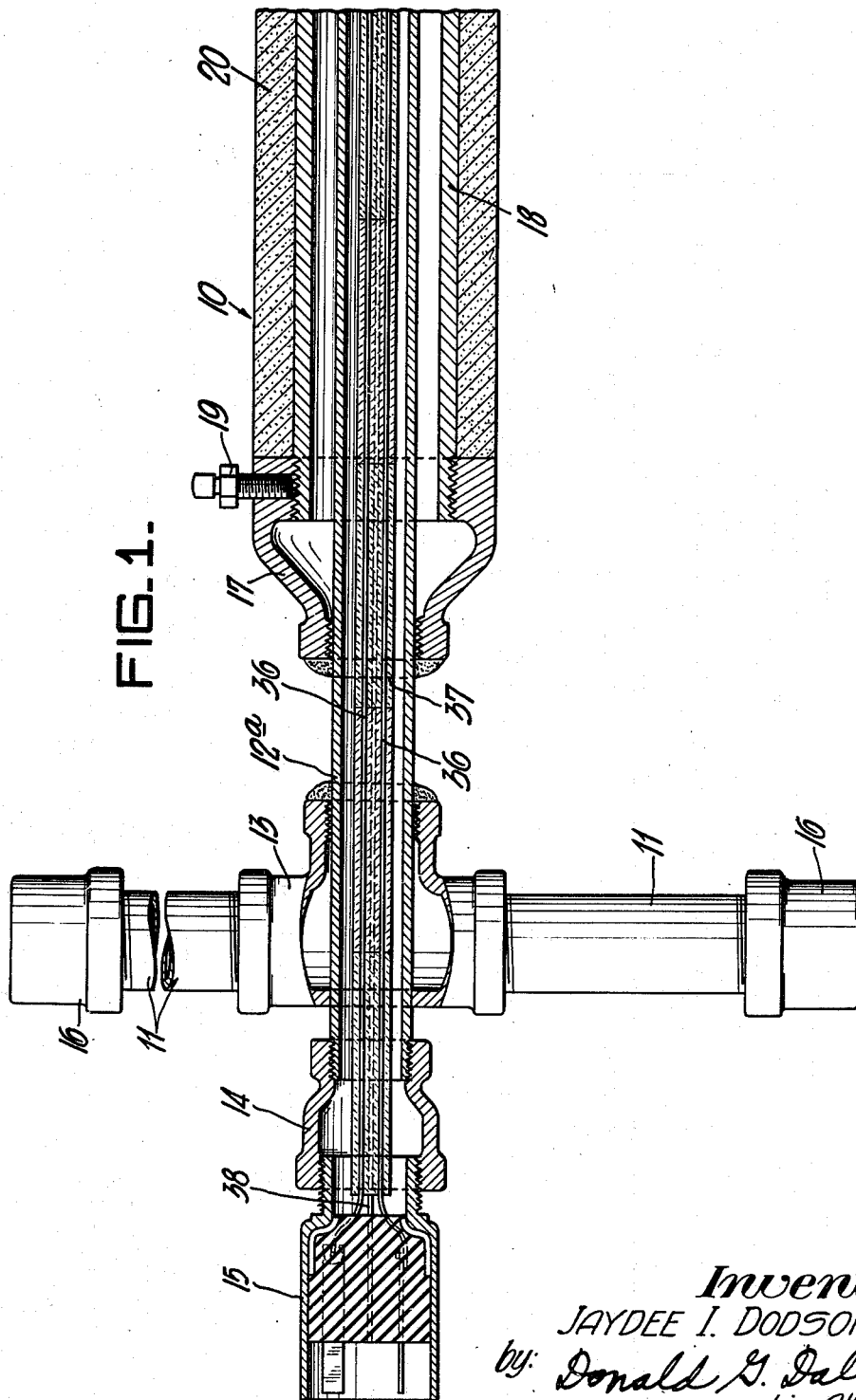
Inventor:
JAYDEE I. DODSON,
by: Donald G. Dalton
his Attorney.

June 16, 1953 J. I. DODSON 2,642,468
THERMOCOUPLE MOUNTING FOR USE IN MOLTEN STEEL
Filed Sept. 15, 1950 2 Sheets-Sheet 2
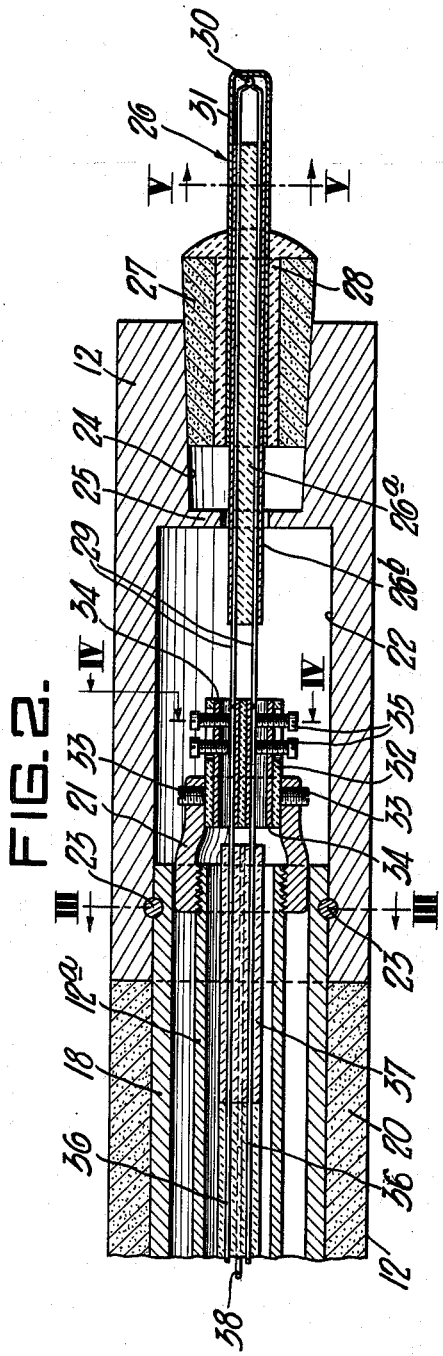
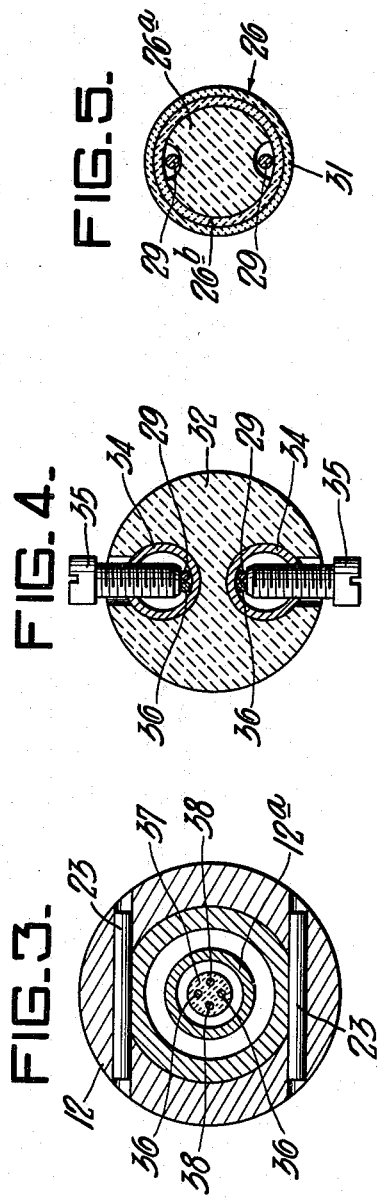
Inventor:
JAYDEE I. DODSON,
by Donald G. Dalton
his Attorney Patented June 16, 1953

2,642,468

UNITED STATES PATENT OFFICE 2,642,468

THERMOCOUPLE MOUNTING FOR USE IN MOLTEN STEEL

Jaydee I. Dodson, Chicago, Ill., assignor to United States Steel Corporation, a corporation of New Jersey Application September 15, 1950, Serial No. 185,073

7 Claims. (Cl. 136—4)

This invention relates to an improved mounting for a thermocouple adapted for measuring high temperatures such as that of a bath of molten steel.

The open-hearth process of making steel requires accurate measurement of the temperature of the bath for high quality and yield of the product. Thermocouples are ordinarily used for this purpose and such use probably involves more severe conditions of service than any other thermocouple application. For greatest accuracy, the hot junction of the thermocouple must be exposed as directly as possible to contact with the bath. For convenience of manipulation and the safety of the operator, the thermocouple and the leads connected thereto are enclosed in a housing or supporting mounting and, to prevent destruction of the latter, it must be made of heat-resisting material and protected from the heat of the bath as fully as possible.

Because of the foregoing peculiar requirements, the known constructions of thermocouple mountings have several serious disadvantages. They are heavy and hard to handle and their use necessitates opening a door of the furnace which is objectionable for obvious reasons. The forward end or head of known mountings has been made of graphite heretofore because of its refractory quality but the carbon thereof creates a reducing atmosphere adjacent the couple which favors contamination of the elements of the latter by silicon from the conventional silica sheath, with resulting embrittlement. In fact, any reducing gas within the sheath of a rare-metal couple is disastrous, particularly if the sheath contains silica (Technologic Papers of the Bureau of Standards, No. 170, Pyrometric Practice, February 16, 1921, page 90). It has been necessary, furthermore, after use of a thermocouple, to allow it to cool for an hour or two before further use, in order to rid the mounting of the heat absorbed thereby, otherwise the temperature of the non-refractory parts exposed instantaneously to the bath would build up to dangerous values by successive reheatings. Finally, known thermocouple mountings have not been easy to take apart for inspection and maintenance.

I have invented a novel thermocouple mounting specially adapted for high temperatures such as those encountered in making steel, which overcomes the aforementioned disadvantages of known constructions. In a preferred embodiment, my improved mounting includes a straight tubular body which effectively protects the thermocouple elements and the leads connected thereto. The body of the mounting is light in weight and easy to take apart since it is made up largely of pipe and standard fittings. It has a head of metal removably secured to the forward end. The head is adapted to receive a small graphite plug for positioning the thermocouple tube. I further provide quickly detachable connections between the thermo-couple elements and the leads. Thus the head and thermocouple proper may be disconnected from the body and leads respectively, and replaced by a duplicate head and couple for immediate re-use without waiting for the head first used to cool to a safe temperature. The leads are threaded through insulator sections having a plurality of longitudinal passages. The sections have other passages by which they are strung on supporting wires. This prevents injury to the leads which might otherwise result from misalinement or turning of the sections. A baffle in the head protects the detachable connections from excessive heat and they are, furthermore, enclosed in a refractory plug. The mounting as a whole is of such design that it may be inserted through the wicket hole in the furnace door and into the bath without opening the door.

A complete understanding of the invention may be obtained from the following detailed description and explanation which refer to the accompanying drawings illustrating the present preferred embodiment. In the drawings, Figure 1 is an axial section through the rear or manipulating end of the mounting;

Figure 2 is a similar section through the forward end of the mounting; and

Figures 3, 4 and 5 are transverse sections taken along the planes of lines III—III, IV—IV, and V—V, respectively, of Figure 2.

Referring now in detail to the drawings, the improved thermocouple mounting of my invention comprises a body 10 having handles 11 at one end and a head 12 at the other. The body comprises a pipe 12a about eight feet long which extends through the side port of a T 13 being brazed thereto, and through a hole in the opposite side wall thereof. A reducer 14 is screwed on to the projecting end of pipe 12a and a two-prong connector plug 15 is screwed into the outer end of the reducer. The handles 11 are simply short lengths of pipe screwed into the end ports of the T 13, with caps 16 screwed on the ends thereof.

A reducer 17 is brazed to pipe 12a a short distance from T 13. An outer pipe 18 about seven and a half feet long is telescoped over pipe 12a and is screwed into the reducer 17 being secured therein by a set-screw 19. The pipe 18 is sheathed exteriorly for the greater portion of its length with sleeves 20 of graphite or other suitable refractory material. A reducer 21 is screwed onto pipe 12a at the end remote from plug 15 and fits in the adjacent end of pipe 18 to center the latter relative to pipe 12a.

The head 12 is a cylinder, preferably of stainless steel. The head is disposed coaxially on the end of pipe 18 and has a bore 22 extending inwardly from the rear end to accommodate the latter. The head is removably secured on the pipe 18 by off-center through pins 23 extending through holes drilled partly in pipe 18 and partly in the head. The forward end of the head is drilled to provide a tapered socket 24. The metal between the bore 22 and socket 24 is left to form a baffle or transverse wall 25 which is drilled to provide a central opening.

A plug 27 of graphite or like material is seated in socket 24. A refractory thermocouple tube 26 extends through a central hole in the plug and also through the opening in the baffle 25. The tube 26 is positioned in the plug by a mass of refractory air-setting cement 28 applied to the end of the plug. The tube 26 carries a rod 26a having spaced longitudinal grooves in the surface thereof and a sleeve 26b snugly fitting on the rod. The tube 26 projects beyond the plug 27. Thermocouple elements 29 are laid in the grooves in rod 26a and extend beyond the end of tube 26 being connected together to form a hot-junction 30. This junction and the ends of the elements projecting through tube 26 are enclosed within a refractory sheath 31 which surrounds the latter and extends through the hole in plug 27.

A cylindrical connector block 32 of refractory material is seated in the forward end of reducer 21 and secured therein by set-screws 33. As shown in Figure 3, the block 32 has a pair of spaced longitudinal conducting sleeves 34 imbedded therein. Binding screws 35 are threaded through radial tapped holes in the sleeves 34. The thermocouple elements 29 extend into the forward ends of sleeves 34. Thermocouple leads 36 extend into the rear ends of the sleeves. The leads and the elements are secured to the sleeves by screws 35, with one lead in contact with each element. The leads extend through spaced holes in a plurality of alined insulator sections 37 disposed end-to-end and coaxially within pipe 18 and the outer ends of leads are secured to the terminals of plug 15. The sections 37 have holes in addition to those through which the leads pass and these additional holes permit the sections to be strung on stiff supporting and staying wires 38 which hold the sections rigidly assembled in accurately alined relation, thereby preventing damage to the leads by bending of the assembly or turning of the sections.

The thermocouple mounting of my invention is characterized by numerous advantages. In the first place, it is light and easy to handle, weighing only about one-third as much as mountings previously employed. Since the mounting is straight throughout, it may be inserted through the wicket-hole of a furnace door and immersed in the bath without opening the door. The use of a stainless steel head with only a small plug of graphite at the end thereof eliminates breakage and reduces the tendency to produce carbon monoxide, the presence of which favors contamination of the thermocouple elements by the silicon of the silica sheath. The baffle between the bore and socket in the head prevents the space rearwardly of the baffle from reaching a temperature above 400° F. during the immersion period.

After one use of my improved mounting, the head and thermocouple may be removed and replaced by spare parts for another use without allowing the hour or two for cooling which has been necessary heretofore. The plug 27 must be removed after each use and the sheath 31 and cement 28 replaced. The plug itself may be reused several times. The elements 29 may be replaced when they have deteriorated beyond further usefulness, simply by backing off screws 35 after removing the head 12. This requires only the knocking out of pins 23. The entire operation of removing the head, replacing a spare and taking a second reading can be completed in less than ten minutes. The plug 27, cement 28 and sheath 31 can be removed and replaced in about one minute. The tubular body 10, furthermore, can be readily taken apart by backing off set-screw 19 and unscrewing the outer pipe 18 from reducer 17. The thermocouple can thus be removed for inspection without removing head 12 if desired. The bracing and staying wires through the additional holes in insulator sections 37 effectively protect the leads 36 from mechanical injury.

Although I have disclosed herein the preferred embodiment of my invention, I intend to cover as well any change or modification therein which may be made without departing from the spirit and scope of the invention.

I claim:

1. A thermocouple mounting comprising an outer pipe, an inner pipe extending into one end of the outer pipe and to a point adjacent the other end thereof, a metal head removably fitted on said other end of the outer pipe, said head having a bore at one end to receive said outer pipe and a tapered bore in the other end, a refractory plug in said tapered bore, a thermocouple tube extending through said plug, thermocouple elements in said tube extending therefrom through said head to a point adjacent said other end of said outer pipe, leads extending through said inner pipe and means mounted on the end of the inner pipe adjacent said other end of the outer pipe for detachably securing said elements to said leads.

2. A thermocouple mounting as defined by claim 1 characterized by a reducer on said one end of said outer pipe, said reducer being secured to said inner pipe at a point intermediate its ends.

3. A thermocouple mounting as defined by claim 1 characterized by said last-mentioned means including a terminal block disposed in said first-mentioned bore.

4. A thermocouple mounting as defined by claim 3 characterized by said last-mentioned means including a reducer screwed onto said inner pipe and effective to center it in said outer pipe, said block being secured in said reducer.

5. A thermocouple mounting as defined by claim 3 characterized by said block being of refractory material and having spaced parallel conducting tubes embedded therein and extending therethrough, adapted to receive said elements and said leads.

6. A thermocouple mounting as defined by claim 1 characterized by said first-mentioned bore terminating short of said tapered bore leaving a transverse baffle therebetween, and said tube extending through said baffle.

7. A thermocouple mounting as defined by claim 1 characterized by a removable transverse through pin detachably securing said head to said outer pipe.

JAYDEE I. DODSON.

References Cited in the file of this patent

UNITED STATES PATENTS

| Number | Name | Date |
|---|---|---|
| 1,979,085 | Vollrath | Oct. 30, 1934 |
| 2,059,480 | Obermaier | Nov. 3, 1936 |
| 2,061,350 | Coupier | Nov. 17, 1936 |
| 2,311,886 | Thomas | Feb. 23, 1943 |
| 2,343,242 | Richmond | Mar. 7, 1944 |
| 2,476,099 | Knudsen | July 12, 1949 |
| 2,556,238 | Tingle | June 12, 1951 |

OTHER REFERENCES

Roeser et al., Bureau of Standards, Journal of Research, 1930, vol. 5, page 795.

Winkler, Blast Furnace and Steel Plant, May 1949, pp. 536–538.